Figure 1:
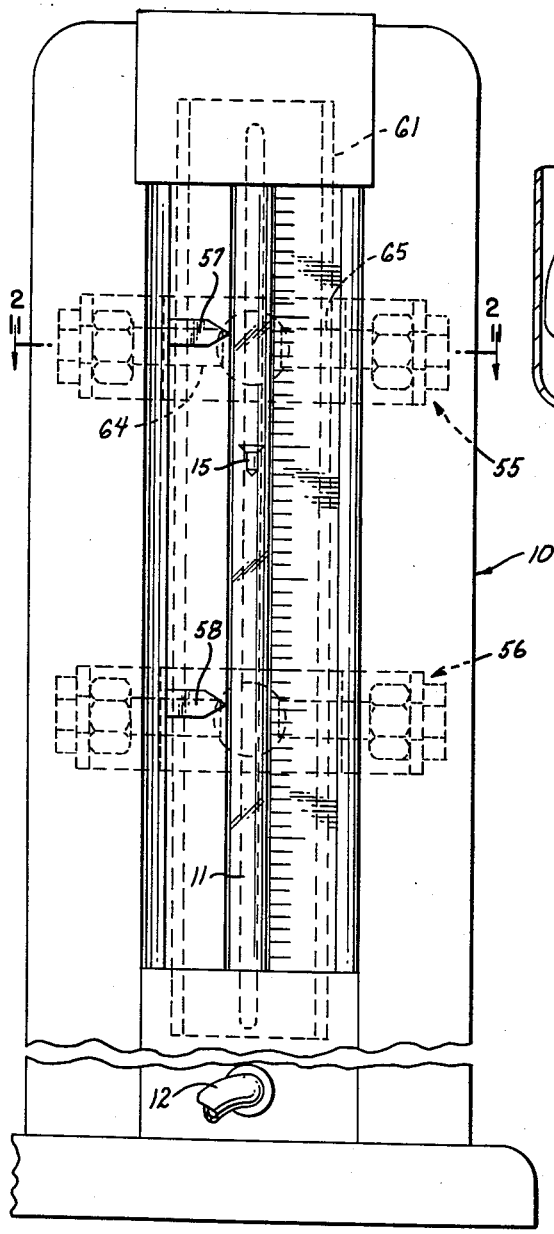

Jan. 22, 1963  L. F. POLK  3,074,264
GAGING DEVICE
Filed April 27, 1960  6 Sheets-Sheet 1

INVENTOR.
LOUIS F. POLK
BY
HIS ATTORNEY

Jan. 22, 1963    L. F. POLK    3,074,264
GAGING DEVICE
Filed April 27, 1960    6 Sheets-Sheet 2

INVENTOR.
LOUIS F. POLK
BY
HIS ATTORNEY

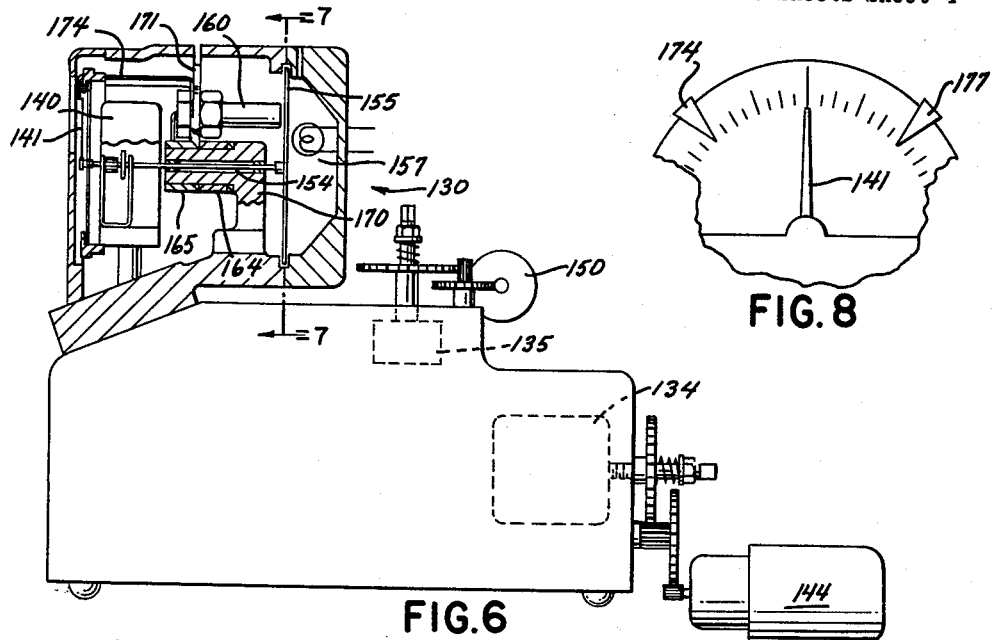
FIG. 6
FIG. 8
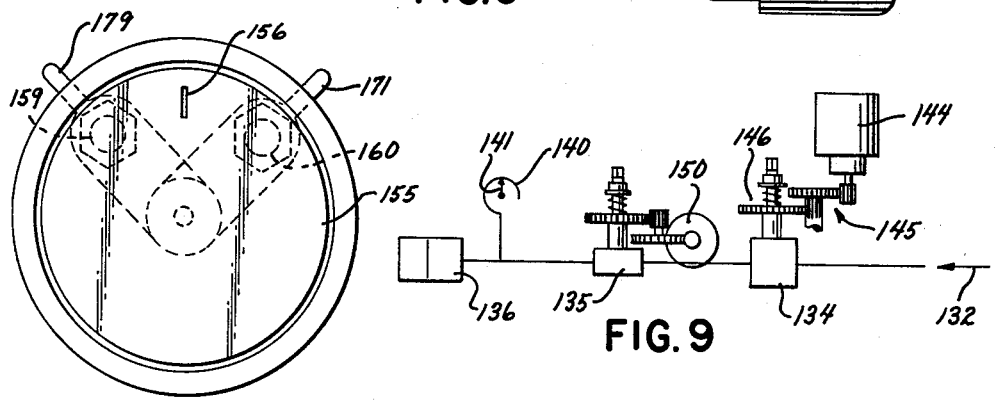
FIG. 7
FIG. 9
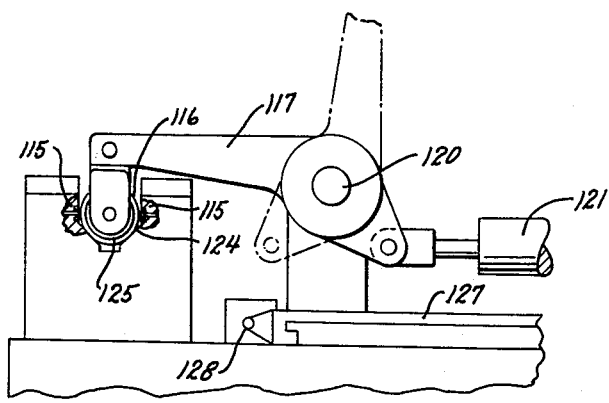
FIG. 10
INVENTOR
LOUIS F. POLK
BY
HIS ATTORNEY Jan. 22, 1963    L. F. POLK    3,074,264
GAGING DEVICE
Filed April 27, 1960    6 Sheets-Sheet 5

INVENTOR
LOUIS F. POLK

BY Ernest J. Hix

HIS ATTORNEY

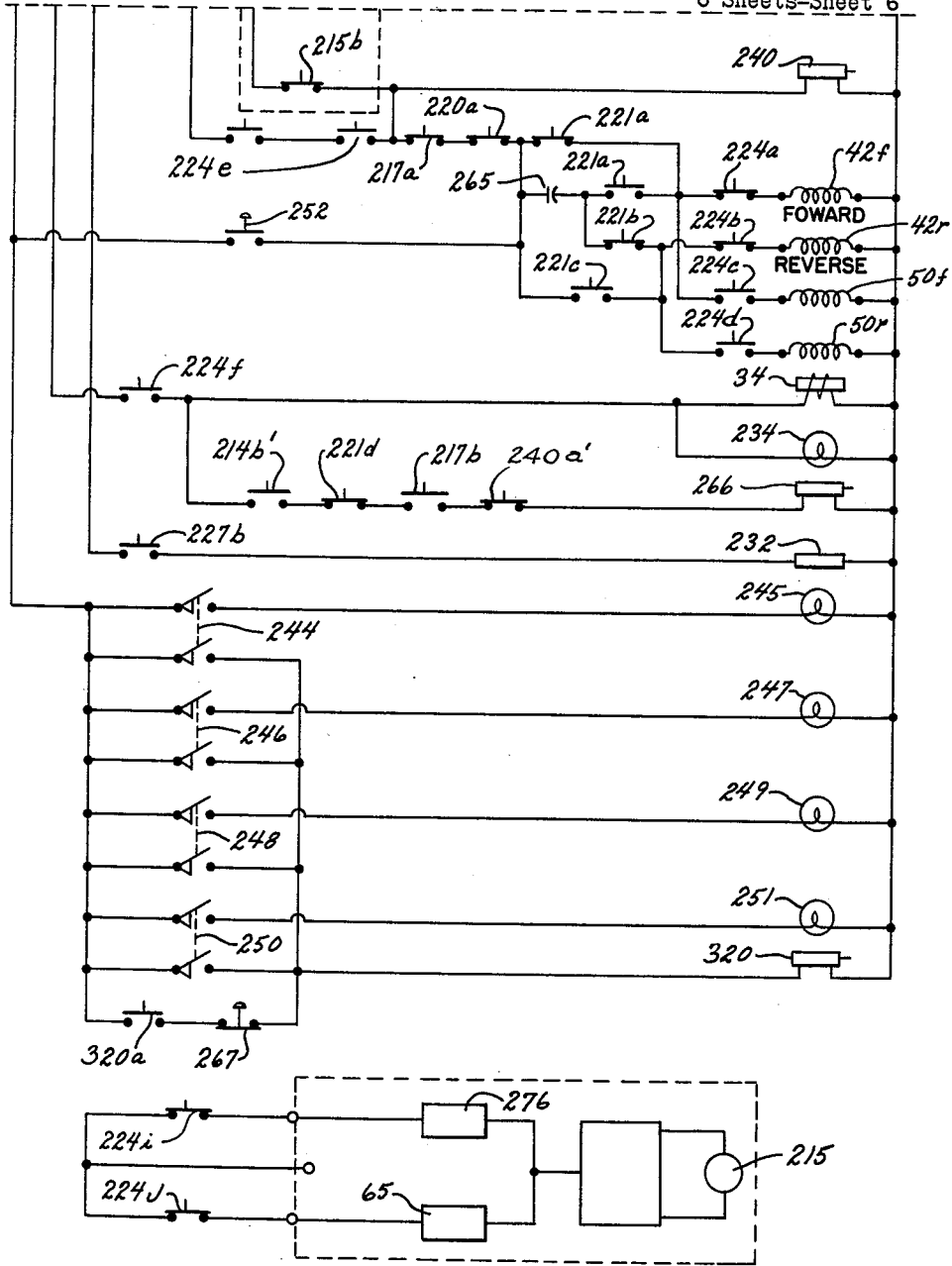

United States Patent Office 3,074,264
Patented Jan. 22, 1963

3,074,264
GAGING DEVICE
Louis F. Polk, Dayton, Ohio, assignor to The Sheffield Corporation, Dayton, Ohio, a corporation of Delaware
Filed Apr. 27, 1960, Ser. No. 25,040
11 Claims. (Cl. 73—37.5)

This invention relates to gaging apparatus and more particularly to a self-adjusting or calibrating gaging circuit.

Various types of gaging circuits are presently employed in industry in the precision measurement of different product characteristics. These circuits, whether basically pneumatic or electrical in character, are commonly applied in measuring dimensions of components of various assemblies and are employed in instruments for manual measurements or in complex automatic gaging equipment.

No matter what the application or the equipment in which employed, such circuits are comparators in nature— comparing the workpiece or a part dimension with some reference such as physically dimensioned masters or gage blocks, gratings and, light wave interference patterns, as examples. This means that for reliable operation the gaging circuit must be periodically checked against these references and adjusted to obtain reference responses. It follows that having been set to properly respond with the references the circuit will, through its comparator function "compare" the workpieces with the references accurately during actual gaging.

In prior known circuits these "setting up" operations have been performed manually by operators subject to human error and involve considerable time lost from actual productive gaging. This is always critical but particularly so in high production automatic, gaging operations where "down time" for a manual check and readjustment of the gaging circuit to insure accuracy of measurement can be quite costly. On occasion because of these difficulties the check and readjustment is not performed as frequently as desired and quality suffers.

It is an object of this invention to provide a precision gaging apparatus for overcoming these difficulties which automatically and rapidly adjusts or calibrates itself, eliminating the human factor, cost of manual adjustment, and loss of productive gaging time while making possible more frequent checks and adjustments to insure the utmost in accuracy of measurement and quality of operation.

It is a further object to provide a gaging apparatus wherein a master reference or master references are automatically placed in control relation with the circuit and setting adjustments automatically made to obtain corresponding reference responses, whereby the gaging apparatus is rapidly and reliably adjusted or calibrated for accurate performance during actual gaging.

It is a further object to provide a gaging apparatus of the pneumatic type for example, wherein reference set-up positions of an indicating element responsive to flow or pressure conditions within the circuit are detected and signaled by suitable means, valve means being automatically set to cause the element to arrive at these reference positions with corresponding reference masters in control relation with the circuit and without further adustment, whereby the circuit is automatically adjusted and calibrated for gaging.

It is a further object to provide a gaging apparatus having an automatic self-adjusting cycle wherein as master references are sequentially placed in control relation with the apparatus adjustments are made to obtain a predetermined response of the apparatus for each master reference, the cycle being terminated when the proper reference responses are obtained with the references sequentially applied and without adjustments therebetween.

Figure 2:
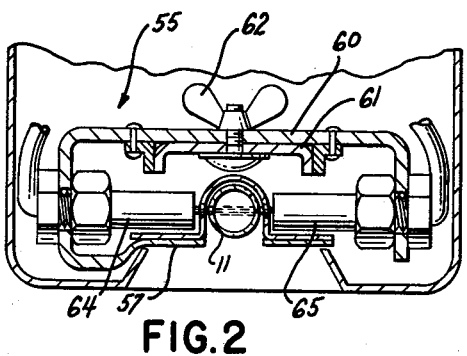
Figure 3:
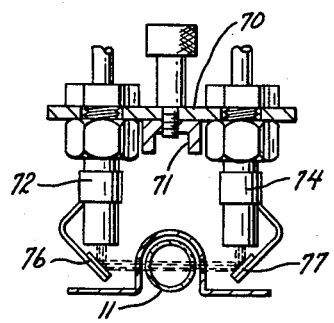
Figure 4:
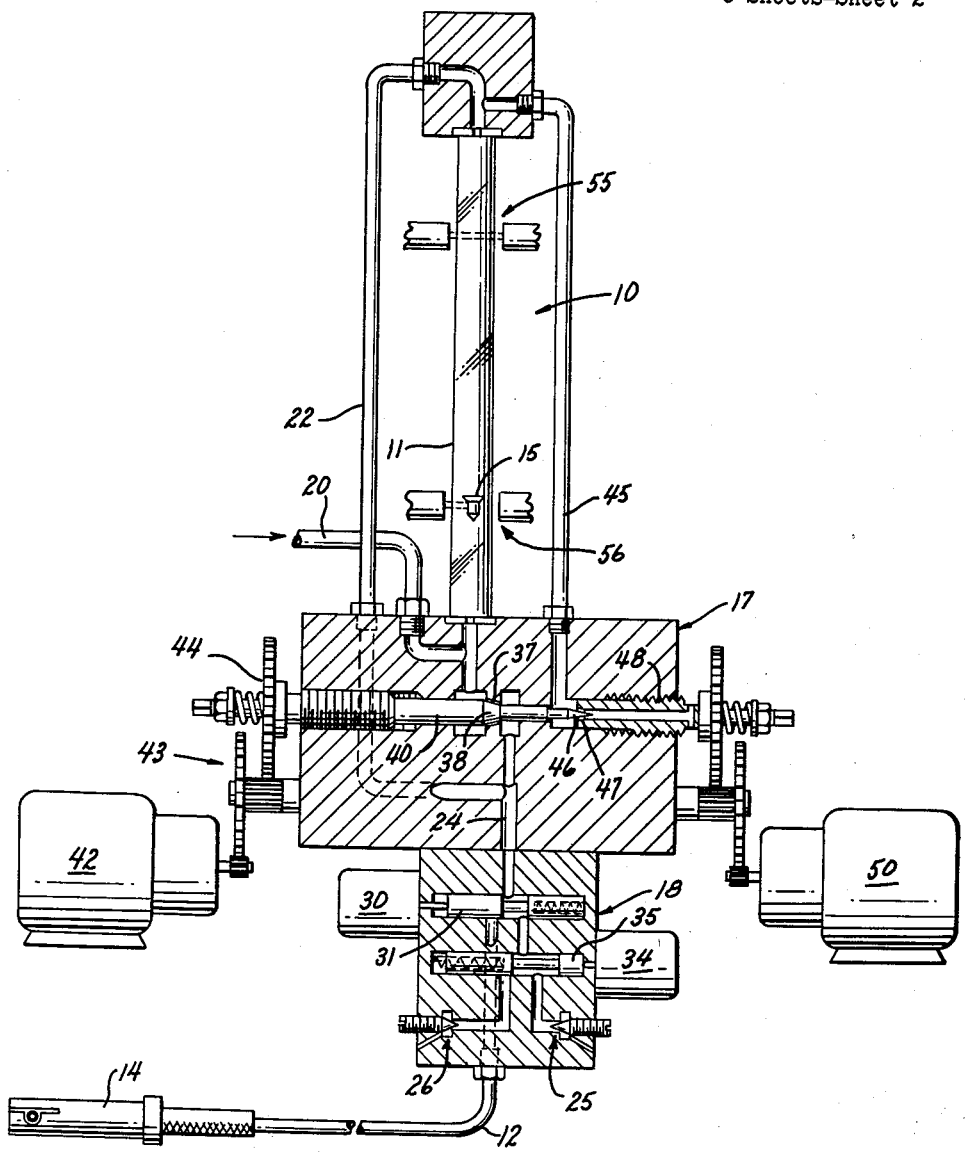
Figure 5:
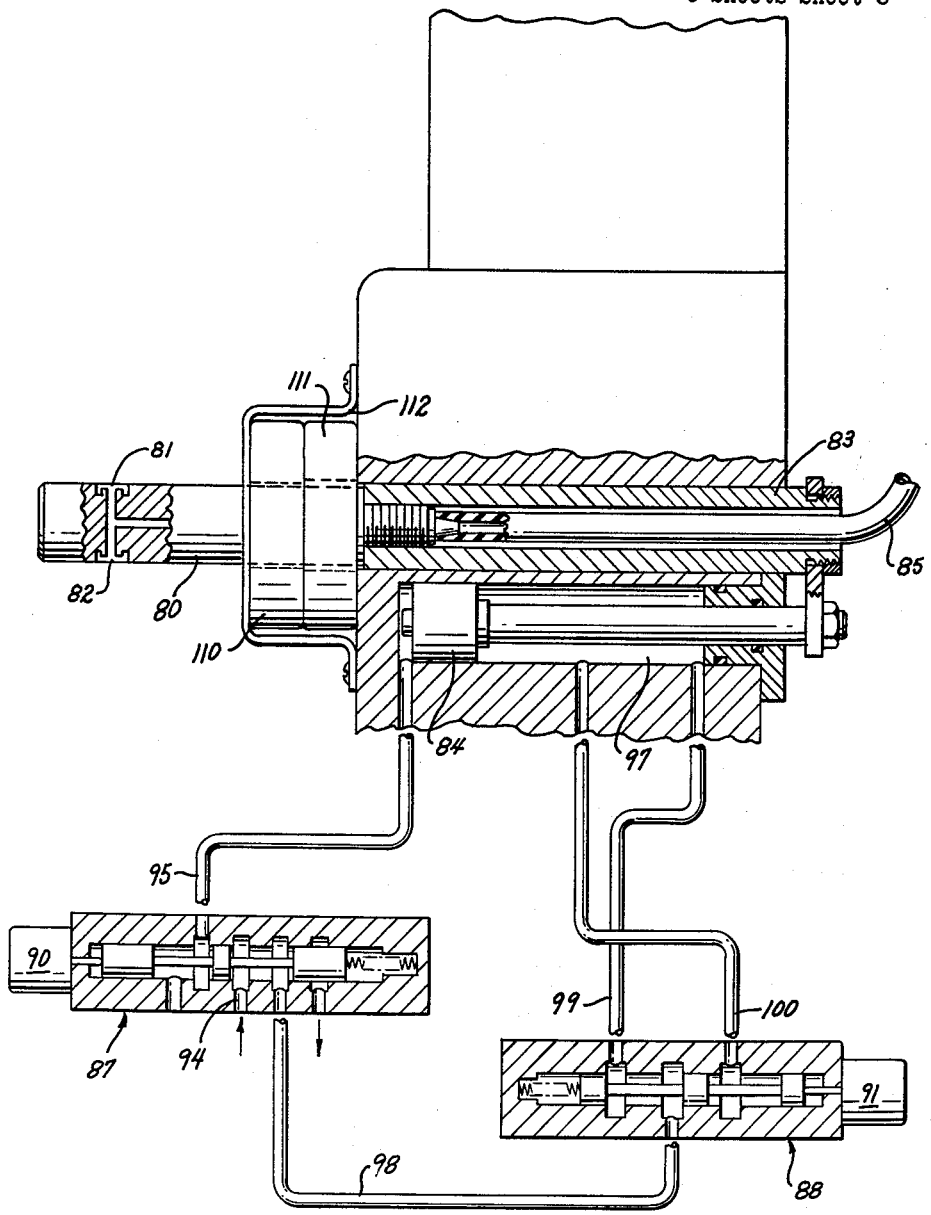
Figure 11:
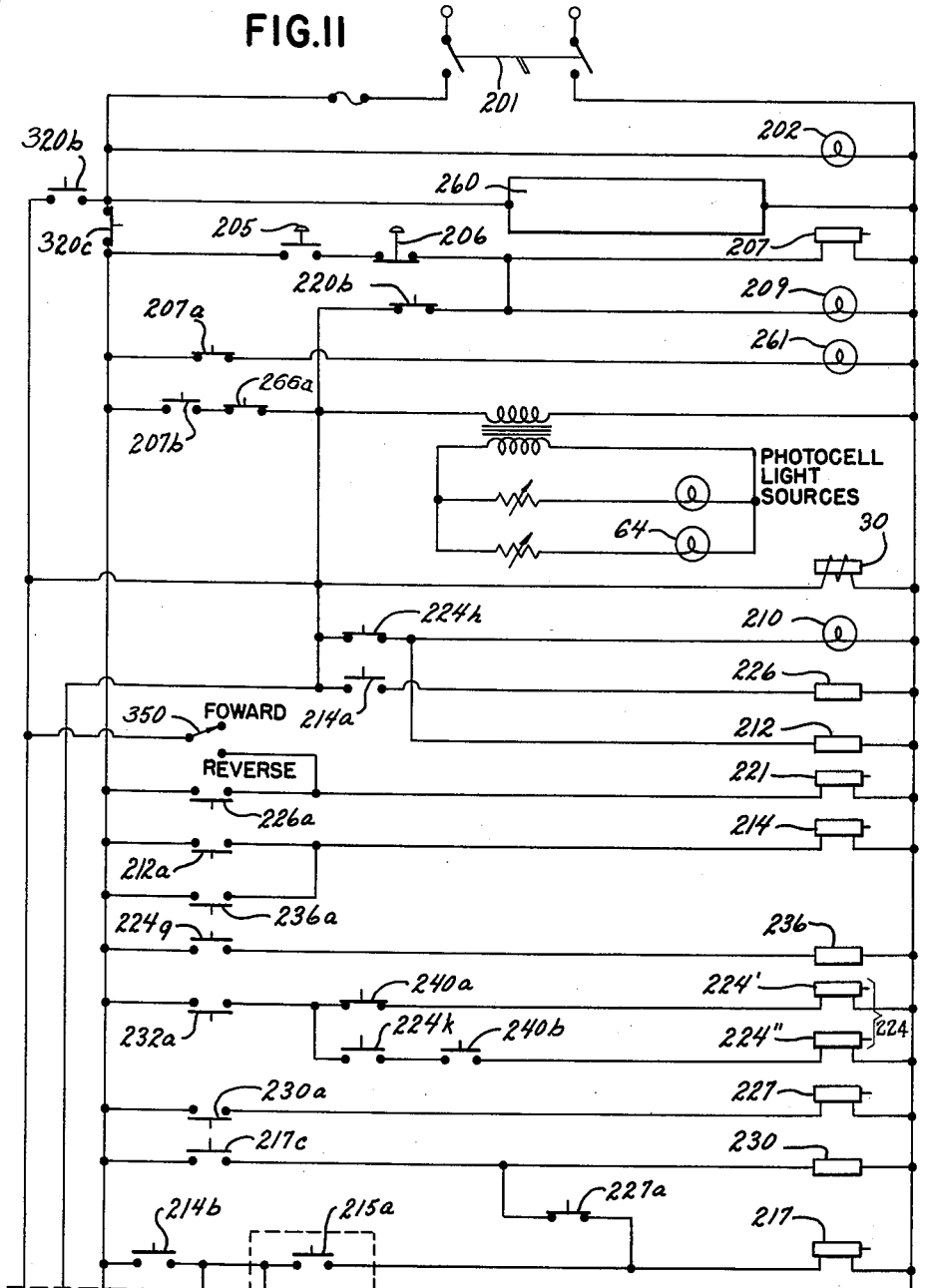

Other objects and advantages of the invention will be apparent from the following description, the appended claims, and the accompanying drawings, in which, FIGURE 1 is a view in elevation of an exemplary indicating instrument used in the present invention, FIGURE 2 is a sectional view taken on line 2—2 of FIGURE 1 illustrating photocell sensing means for detecting and signaling the position of the indicating element in the instrument, FIGURE 3 illustrates a modified version of the signal arrangement of FIGURE 2, FIGURE 4 is a diagrammatic sectional view illustrating the circuitry of the instrument of FIGURE 1 as well as its calibrating and master reference components, FIGURE 5 diagrammatically illustrates an exemplary control system for placing a gage head automatically in association with physically dimensioned maximum and minimum masters, FIGURE 6 is a view in elevation and partial central vertical section of an exemplary pneumatic measuring instrument of the back pressure type embodying the present invention, FIGURE 7 is a view taken on line 7—7 of FIGURE 6 showing the adjustable indicator element position signaling arrangement, FIGURE 8 is a fragmentary illustration of a portion of the indicating dial and element of the instrument of FIGURE 6, FIGURE 9 is a diagrammatic circuit of the illustrated back pressure measuring instrument, FIGURE 10 shows an exemplary arrangement for applying a physically dimensioned master to a pneumatic gage head for measuring an external dimension, and FIGURE 11 is an exemplary circuit diagram of an automatic controlling and actuating circuit which can be used with the instrument calibrating structure and master references of FIGURES 1 and 4.

In the present invention the accuracy of operation of gaging apparatus is automatically checked against a reference or references and adjustments automatically made as necessary to insure accurate response and to eliminate manual adjustment and "down time" for recalibration. Physically dimensioned masters, simulated, or other master references could be employed. Recalibration can be automatically done as necessary during operation of the gaging system on an automatic cyclic basis or manually initiated. It could be automatically done, as examples, between each gagaing operation, periodically as so many parts are gaged, on a count or time basis, or when so many consecutive parts are rejected. The invention would have particular application in a continuous cyclic multiple gaging station in an automatic production line.

A pneumatic gaging circuit is illustrated for purpose of disclosing an exemplary embodiment of the present invention. It includes a gage head at which exhaust to atmosphere is controlled by a work dimension and an indicating tube having an indicating float or element positioned therealong in accordance with the flow. Maximum and minimum set-up positions of the indicating element are detected by photocell units adjacent the upper and lower ends of the tube. A control circuit is provided which automatically places master references in control relation with the circuit and simultaneously automatically adjusts and sets valve means within the circuit to position the element at these maximum and minimum points, thus automatically setting up or calibrating the instrument for gaging.

Referring particularly to the drawings, FIGURE 1 illustrates an exemplary instrument 10 of the type where air from a suitably controlled source passes upward through an internally tapered passage of a transparent flow tube 11 and out through a connecting conduit 12 to a gage head 14 (shown in FIGURE 4) where the escaping flow is controlled in accordance with the dimension to be measured. An indicating element or float 15 positions itself along column 11 in accordance with the resulting flow and the measured dimension.

Referring now to FIGURE 4, immediately below column 11 is shown a calibrating section 17 for use in setting up the circuitry prior to gaging. Below section 17 is a master reference unit 18 which, in this exemplary application, includes master orifices which can be automatically connected to the outlet of column 11 for calibration purposes. It will be appreciated that physically dimensioned masters can also be automatically applied and structure or accomplishing this will be later discussed in detail.

Air from a regulated supply passes through conduit 20, upward through column 11 and downward through conduit 22 and passage 24 to the master reference unit 18.

Precision gaging circuits are commonly adjusted to provide nominal reference responses in conjunction with one or more reference masters. It is most usual to apply a pair of masters of differing dimensions or simulated dimensions in order that both the amplification of the instrument be checked and established and the responding points of the indicating element also be determined. While physically dimensioned masters are at present used in most instances, with pneumatic gaging circuits it is quite possible to provide reference orifices which, when connected in place of the measuring gage head at the outlet of the circuitry, serve to simulate the master dimensions by providing the same flows through the measuring circuit as would be obtained if a physically dimensioned master of known reference dimension was placed in association with the gage head. In the illustration of FIGURE 4 the master unit 18 provides an adjustable orifice at 25 simulating the flow if a minimum sized master were placed in association with gage head 14. A second orifice at 26 in conjunction with orifice 25 simulates a maximum sized master. Unit 18 includes valving and solenoid valve operating structure to selectively connect passage 24 to these reference orifices or to conduit 12 leading to gage head 14.

When solenoid 30 is energized valve 31 takes the illustrated position and passage 24 is connected to minimum orifice 25. Energization of solenoid 34 moves its associated valve 35 to the left and, in this condition, flow passes through both orifices 25 and 26 to establish a maximum reference flow. Deenergization of both solenoids 30 and 34 results in valves 31 and 35 assuming positions to connect conduit 12 and gage head 14 to passage 24, thus connecting gage head 14 to the indicating column for actual gaging operations.

A precisely controlled amount of flow can be diverted directly from inlet conduit 20 to passage 24, effectively by-passing column 11. Valve seat 37 in section 17 cooperates with opposed tapered surface 38 on valve stem 40 to control the flow through this by-pass passage, diverting a proportionate amount of the supplied air around column 11 and controlling the amplification of the circuit. Stem 40 is threaded within section 17 and is adjustably driven from electric motor 42 through suitable gearing 43 and slip coupling 44 which is provided to prevent jamming.

An adjustable bleed to atmosphere from the upper end of column 11 is provided through conduit 45 and a hollow valve element 48 threaded into section 17. The amount of flow throug conduit 45 is controlled by a surface 46 at the outer end of stem 40 cooperating with an opposed surface 47 on element 48. Thus as motor 50 is energized the bleed to atmosphere is adjustably varied. This results in positioning indicating element or float 15 along column 11 in set-up operations as desired..

Through the valving arrangement shown, as stem 40 is adjusted not only is the by-pass from conduit 20 to passage 24 controlled, but a compounding action is obtaned through movements of valve surface 46 relative to surface 47 to reduce the number of overall adjustments required.

In order to carry out the automatic calibrating operation of the present invention in conjunction with the reference unit 18 of FIGURE 4 it is necessary to provide structure for detecting the nominal maximum and minimum positions of element 15 along column 11. In the exemplary application illustrated this detection is by means of photocell units. Other detection means could be employed. As examples, inductive or magnetic detection of float position could be used. These photocell units 55 and 56 respectively cooperate with maximum and minimum tolerance markers 57 and 58.

FIGURE 2 illustrates particularly photocell unit 55. As therein illustrated a bracket 60 is adjustably positioned vertically along a supporting channel 61 and clamped in position by means of wing nut 62. This adjustment is accessible through the rear of the instrument. At its left-hand side as seen in FIGURE 2 bracket 60 supports a light source 64 and at its right-side it carries a photocell detector unit 65. When float element 15 arrives at the level of unit 55 it interrupts the passage of light from source 64 to detector 65 and its position is signaled. It will be noted that bracket 60 also provides the upper limit marker 57 so that as the photocell unit 55 is adjusted up and down the maximum limit marker goes with it. Lower photocell unit 56 and minimum limit marker 58 are similarly constructed and supported.

An alternate arrangement of the photocell detector unit construction is shown in FIGURE 3. As therein shown a bracket 70 adjustably mounted along a channel 71 carries parallel light source 72 and detector 74. The light passes through column 11 by means of mirrors 76, 77. Otherwise this construction, while being somewhat more compact in transverse dimension, operates in the same manner as that more particularly described with reference FIGURE 2.

The adjustable calibrating structure provided by motors 42 and 50, photocell detector units 55, 56 and the reference unit 18 are used in conjunction with an electrical circuit later described with reference to FIGURE 11 to obtain fully automatic calibration of the circuit.

In some instances it may be desirable to provide physically dimensioned masters for placement in association with the gage head during calibration or set-up operations. FIGURES 5 and 10 illustrate an exemplary structure for accomplishing this. In FIGURE 5 a gage head 80, having outlet orifices 81 and 82 for measuring an internal diameter, is mounted on a support 83 connected to piston 84 for reciprocation therewith. Conduit 85 is provided to connect head 80 to a suitable pneumatic measuring circuit which can be of the character previously described. Piston 84 is adjustably reciprocated under the control of valve assemblies 87 and 88 respectively actuated by solenoids 90 and 91. Assembly 87 is connected to a suitable hydraulic supply at 94 and has outlets leading respectively through conduit 95 to the left-hand end of a chamber 97 including piston 84. It has a further outlet leading through conduit 98 to valve assembly 88 for purposes as later described. Valve assembly 88 has connections at 99 and 100 to points axially displaced along chamber 97 as shown.

With soleniods 90 and 91 deenergized as shown, hydraulic fluid under pressure from supply 94 is metered through valve assemblies 87 and 88 to the rear end of chamber 97, keeping piston 84 to the left as fluid exhausts through conduit 95 and assembly 87. To retract head 80 into minimum master 110 which together with maximum master 111 is mounted by bracket 112, both solenoids 90 and 91 are energized moving the respective valve assemblies to their other positions. In this condition hydraulic fluid under pressure from supply 94 passes through valve assembly 87 and conduit 95 to be effective on the left-hand face of piston 84. Exhaust through conduit 99 is blocked while exhaust is possible through conduit 100, assembly 88 and 87. Thus when piston 84 reaches the region of the inlet of conduit 100 further exhaust is impossible and the movement stops with orifices 81 and 82 positioned within minimum master 110.

Deenergization of solenoid 91 then permits exhaust through conduit 99 so that piston 84 can further retract to bring the orifices within maximum master 111. Thus an automatic positioning of gage head 80 within minimum and maximum masters 110 and 111 is achieved.

In a further modification using physically dimensioned masters as shown in FIGURE 10 the exemplary gage head includes opposed orifices 115 connected to a suitable pneumatic measuring circuit. A cylindrical master 116, shown in calibration position, is carried at the outer end of lever 117, pivoted at 120, and actuated by rod 121 from a suitable cylinder not shown. Through actuation of rod 121 master 116 can be raised to a position remote from the gaging position or lowered for calibration. Master 116 has axially displaced sections 124 and 125 of different diameters. The base 127 which supports pivot 120 and the master assembly is movable perpendicular to the plane of the drawing by means of a further cylinder 128 to alternately position the maximum sized portion 124 of master 116 in opposition to orifices 115 or to position minimum dimensioned portion 125 in control relation thereto.

The automatic calibration provided by the present invention is capable of broad application in the gaging field. One application to a flow measuring circuit has been previously described with particular reference to FIGURES 1 and 4. A further exemplary embodiment is illustrated in FIGURES 7 to 9 as applied to a back pressure type pneumatic gaging circuit.

The basic circuit of the exemplary instrument 130 of FIGURE 6 is shown diagrammatically in FIGURE 9 where air from a suitable source 132 passes, in sequence, through an adjustable regulator 134, an adjustable restrictor 135, and to a gage head 136 where the escaping flow is controlled in accordance with a dimension to be measured. As is well known in the art the back pressure changes obtained between the orifices of head 136 and restrictor 135 are effective on a bourdon tube 140 to actuate a pointer element 141 for indicating the resulting back pressure which is in turn indicative of the dimension measured. The operation of regulator 134, which effectively controls the amplification of this circuit, is controlled by an electric motor 144 operating through gears 145 and slip coupling 146 in a manner similar to that for the flow arrangement earlier described. Similarly an electric motor 150 controls restrictor 135. Positions of restrictor 135 are most effective in positioning pointer 141.

As seen in FIGURE 6, pointer 141 is mounted on a common shaft 154 with a disc-like mask 155 which has a slit 156 therein for purposes as later described. A light source is mounted at 157 within instrument 130 and at the right-hand side of mask 155. A pair of photocell detector units 159 and 160 are respectively supported on arms journaled at 164 and 165 on the same support 170 which carries shaft 154. Inasmuch as the position of pointer 141 and the circuit response depends upon the pressure downstream of restrictor 135, it is possible to, as an alternative to detection through the photocell arrangement, detect a reference response or reference responses of the circuit through electrical signal means controlled by that pressure.

Arm 171 (see FIGURE 6) which carries detector unit 160, also mounts the minimum tolerance marker 174. The portion of arm 171 which projects beyond the casing of instrument 130 is accessible so that the photocell-marker assembly can be adjustably positioned. Similarly arm 179 which carries detector 159 also positions maximum limit marker 177. Through this arrangement, as mask 155 rotates with pointer 141, slit 156 which is in line with the pointer, admits light to detector 160 at the minimum marker 174 and to detector 159 at maximum marker 177. This signals the position of pointer 141 for calibration operations which are automatically obtained through adjustment of electric motors 144 and 150 in conjunction with calibration reference masters of either the orifice or physically dimensioned types as previously described.

The electrical circuit diagrammatically shown in FIGURE 11 is particularly provided for use with the structure of FIGURES 1, 2 and 4 to make possible a completely automatic calibrating system.

The general operation begins when solenoid 30 is energized to switch the outlet of column 11 from gage head 14 to minimum orifice 25. At this time in the automatic cycle the position of float element 15 along column 11 is not known. As the first step in the automatic cycle the float is carried to the bottom of column 11 through energization of motor 42 and the compound by-pass and bleeder adjustments. Motor 42 is energized for a period which will insure under the varied operating conditions that may be encountered that the float is carried to the bottom of the tube no matter what its initial position was. The direction of rotation of motor 42 and valve stem 40 is then reversed. When float 15 interrupts the light beam of photo detector unit 56 this condition will be signaled. Motor 42 then stops.

Solenoid 34 is then energized (solenoid 30 remains energized) and the maximum reference flow condition is obtained. Normally under this flow condition the float would be at or adjacent the top of the column. However, irrespective of its position, motor 50 is driven to retract valve element 48, opening the bleed for a predetermined length of time to insure that float 15 arrives at the top of column 11. Motor 50 is then reversed and the float is lowered until the light beam of photo detector unit 55 is interrupted to signal this condition at which time motor 50 stops its rotation.

At this point the minimum flow condition is reestablished and by-pass motor 42 rotated through the same predetermined length of time to carry float 15 to the bottom of the tube following which it reverses until detector unit 56 signals that the float is at the minimum limit position. The maximum flow condition is again established, following which the cycle of moving the float to the upper end of the tube and then lowering it to the position of unit 55 through adjustment of motor 50 and the bleed escapement is repeated. Calibration is completed whenever after the float is positioned through adjustments of by-pass motor 42 at the minimum position detected by unit 56 the application of the maximum flow condition results in the float interrupting unit 55, signaling that the float is at the maximum limit. Thus the cycle is progressively refined as necessary until the lower and upper limits are sequentially reached by float element 15 without intermediate adjustments. In practice, due to the rapidity of operation of the electrical circuit and adjustments, and the compounding of the valve structure, the complete cycle is rapidly accomplished even with the coarsest of beginning conditions. Of course check and recalibration during a gaging operation require only minor adjustments and these are even more quickly made.

Referring more particularly to the circuit of FIGURE 11 closing of master switch 201 provides power to the automatic control circuit including the photocell power supply 260. Light 202 lights to indicate that power is applied to supply 260 and the remainder of the circuit.

When cycle start button 205 is manually depressed relay 207 is energized. Automatic cycle initiation could be used, as previously discussed. In the following description of the circuitry the contacts controlled by each relay are designated by lower case letter additions. In this instance energization of relay 207 results in immediate closing of contacts 207b in a holding circuit including a switch 266a to the relay which is maintained until the calibration is completed. At the same time contacts 207a are opened, deenergizing signal lamp 261. Manually depressed stop button 206 serves to terminate the cycle as desired.

Simultaneous with energization of relay 207 and the closing of switch 207b solenoid 30 is energized to operate valve element 31, closing off the flow of gaging air to head 14 and diverting it to the minimum orifice 25 (see FIGURE 4). Minimum master solenoid 30 is spring returned and the maximum and minimum master solenoids 30 and 34 are connected so that flow takes place through the minimum orifice opening 25 throughout the calibration and the maximum orifice flow through orifice 26 is controlled to establish the maximum and minimum limit conditions.

Gage calibration light 209 and minimum calibration light 210 are lit switches 220b and 224h to indicate that the cycle is in operation with the minimum master condition applied.

Timer 212 is energized at this time and after a predetermined time delay contacts 212a close to energize relay 214.

Energization of relay 214 energizes the by-pass adjustment motor 42 through contacts 214b, 215b, 217a, 220a, 221a, 224a, 221b and 224b in the central portion of the circuit. Reverse winding 42r of by-pass adjustment motor 42 is energized through condenser 265 while forward winding 42f is energized directly for forward rotation, retracting the spindle 40 to open the by-pass and lower float 15.

Closing of contacts 214a by relay 214 energizes timer 226. After timer 226 times out at the end of a predetermined delay period, contacts 226a are closed to energize relay 221 reversing the conditions of the contacts which it controls from those illustrated, note contacts 221a and 221b. This results in a reversal in the direction of rotation of by-pass motor 42 to bring float 15 from the bottom of the tube up toward the minimum limit.

When float element 15 arrives at the minimum limit indicated by marker 58 it interrupts the light beam and the detector 276 of photocell unit 56 signals the condition. Photocell relay 215 is then energized reversing the condition of its contacts 215a and 215b. Closing of contact 215a energizes relay 217 which closes contacts 217c to provide a holding circuit through contacts 227a. Closing of contacts 217c also energizes timer 230 which, after a given delay, closes contacts 230a to eergize relay 227 which in turn after a predetermined delay closes contacts 227b to energize timer 232.

After timer 232 times out it closes contacts 232a to energize windings 224' relay 224 through closed contacts 240a to latch the relay. This results in operation of contacts 224" of relay 224 throughout the circuit. Relay 224 closes switches 224e and 224f and opens switches 224i and 224j.

Closing of contacts 224f energizes the maximum master solenoid 34 to establish the maximum master or reference condition. Light 234 indicates this condition.

Closing contacts 224g energizes timer 236 which allows a time delay for the previous relay operations to be accomplished. After its established delay timer 236 closes contacts 236a, energizing relay 214 to operate its associated contacts and energize bleeder motor 50 the conditions of contacts 224a, 224b, 224c and 224d having previously been established. Bleeder motor 50 through the winding 50f and 50r is driven in a forward direction for a time delay established by timer 226, raising float 15 to the upper end of the tube. After this established delay, relay 221 is again energized to reverse the direction of rotation of bleeder control motor 50 to lower the float until photo detector 65 of unit 55 senses the arrival of float 15 at the upper limit established by marker 57 at which time photocell relay 215 is energized.

As before, operation of photocell relay 215 energizes relay 217 which in turn energizes timer 230. After timer 230 times out, it energizes relay 227 which in turn energizes timer 232 and after its predetermined delay unlatch coil 224" of relay 224 is energized to unlatch the relay through contacts 224k and 240b. Relay 240 is energized whenever either of the motors 42 or 50 is energized. However, when bleeder motor 50 is energized relay 240 is held to maintain its contact conditions after contacts 215a are closed.

The cycles previously described through adjustment of the by-pass motor 42 and bleeder motor 50 are automatically repeated until the following conditions exist. First photo-relay 215 is energized and remains energized because float 15 is in position at the lower limit of marker 58 following which it is positioned at the upper limit of marker 57 without any adjustment of bleeder motor 50 being required between these positions. When this condition is achieved both relays 215 and 217 are energized. Thus when coil 224' is energized to latch relay 224, relay 214 is energized, relay 221 deenergized, relay 217 is energized and relay 240 deenergized. Relay 266 is energized through closed contacts 214b, 221d, 217b and closed contacts 240a', operating its associated contacts, and the calibration is completed.

Protective features arealso incorporated into the circuitry. Limit switches with dual contacts are provided to establish a forward and rearward limit of rotation of the respective calibration drive motors 42 and 50. Switches 244 and 246 are actuated respectively at the forward and rearward limits for motor 42 while switches 248 and 250 are operated respectively at the forward and rearward limits of motor 50. When a motor is near the end of its possible travel the appropriate limit switch will close. This ignites a respective one of the lights 245, 247, 249 and 251 to signal the condition and also energizes relay 320 which closes contacts 320a and 320b to provide a holding circuit. Pushbutton 267 serves to break this circuit as desired.

Opening of contact 320c in the upper portion of the circuit diagram shuts off power to the control circuitry and energizes manual switching controls to enable the operator to return the motors into an operating range. This is accomplished by contacts 320b closing to a manually rotatable switch 350 between motor forward and motor reverse switch positions. Through operation of siwtch 350 the motor can be controlled as desired as indicated by the signal lights. Closing of contacts 320b also energizes maximum and minimum solenoids 30 and 34 in order that during the motor rotation under manual operation the operator can watch the float to determine the extent of motor drive. Manual motor drive is accomplished through switch 252.

If under an extreme operating circumstance float 15 should not stop and remain in position at a point determined by one of the photo detector units 55 and 56, contacts 227a will hold the circuit to relay 217 so that operation will continue without running beyond the limits of the adjustment ranges. Should, while the float 15 is being driven to the ends of the tube, the photocell relay 215 be momentarily energized, relay 240 remains energized to prohibit malfunction of the unit as though a calibration point has been reached through the reverse movement. Provision can readily be made to automatically continue actual gaging cycles when the recalibration is completed by using signals provided within the electrical circuit just described.

While a circiut has been described with particular application to maximum and minimum masters it will be appreciated that such a circuit could be most readily established for operation with systems utilizing only a single master. Similarly, while time delays have been provided so that the float will be moved from any position in the tube to the extreme ends thereof, this maximum movement would rarely be used because the circuits are rarely in such an extreme condition of out-of-adjustment. Under normal conditions through adjustments of the various timers this time delay for movement to the end of the flow tube 11 would be materially decreased because routine operations require only a minute refinement in the calibration settings.

Thus it is seen that an automatic self-adjusting gaging apparatus has been provided with unique features for rapid self-calibration and with elimination of the human element. This circuitry can be provided for manual initiation or through use of a counter can be automatically energized after any predetermined sequential number of parts have been measured, as examples of applications. Other signals either responsive to the gaging operation or otherwise can be provided to initiate calibration. As a further example if a given number of rejects in the parts processed have been detected it may be desired to rapidly recheck and recalibrate the operating circuit to insure that it is not at fault. Other applications to automatic gaging equipment in automation, processing lines etc. can be readily visualized.

While the forms of aparatus herein described constitute preferred embodiments of the invention, it is to be understood that the invention is not limited to these precise forms of apparatus and that changes may be made therein without departing from the scope of the invention, which is defined in the appended claims.

What is claimed is:

1. An automatic self-adjusting gaging apparatus comprising a gaging circuit including a gage head which controls circuit response in accordance with a gaged product characteristic, adjustment means in said circuit for setting and determining the relationship of circuit response to gage head measurements, signal means controlled by the response of said gaging circuit, reference means for control association with said circuit, and control means responsive to said signal means and connected to said adjustment means for automatically setting said adjustment means to calibrate the gaging apparatus and obtain a desired circuit response with said reference means in control association with the circuit, whereby a desired relationship of circuit response to gage head measurements during actual gaging is maintained and predetermined.

2. An automatic self-adjusting gaging apparatus as set forth in claim 1 in which said circuit is an air circuit and said signal means is responsive to air flow.

3. An automatic self-adjusting gaging apparatus comprising a gaging circuit including a gage head which controls circuit response in accordance with a gaged product characteristic, adjustment means in said circuit for determining the relationship of circuit response to gage head measurements, first and second reference means for control association with said circuit, said circuit having a predetermined response for each of said reference means for nominal gaging operation, signal means associated with said circuit operative at each of said predetermined responses, and control means responsive to said signal means for automatically placing said reference means alternatively in control association with said circuit and setting said adjustment means to obtain the corresponding reference circuit responses, said control means including means for terminating the cycle of operation when said reference responses are obtained with the first and second reference means alternately applied and without adjustment therebetween, whereby a desired relationship of circuit response to gage head measurements during actual gaging is maintained and predetermined as based on said reference means.

4. An automatic self-adjusting pneumatic gaging apparatus comprising a pneumatic comparator gaging circuit connectable at one end to a source of air under pressure and at the other end to a gage head which controls flow through the circuit in accordance with a gaged product characteristic, adjustment valve means in said circuit for setting and determining the relationship of circuit response to changes in flow through said gage head and the measured characteristic, signal means responsive to flow conditions in the gaging circuit, master reference means for control association with said circuit for obtaining reference flow conditions during non-gaging periods, and control means responsive to said signal means and connected for automatically adjusting said valve means to obtain a desired flow characteristic with said reference means in control association with the circuit, whereby a desired relationship of flow response to gage head measurements during actual gaging is maintained and predetermined.

5. An automatic self-adjusting gaging apparatus comprising a pneumatic comparator gaging circuit connectable at one end to a source of air under pressure and at the other end to a gage head which controls flow through the circuit in accordance with a gaged product characteristic, said circuit having a responsive element operable in accordance with flow conditions of the circuit, adjustable valve means in said circuit for setting and determining the relationship of circuit flow conditions to flow through the gage head and the characteristics measured, master reference means for control association with said circuit providing reference flow conditions therein, signal means controlled by predetermined responses of said responsive element, and control means responsive to said signal means and connected for automatically setting said valve means to obtain the desired response of said element with said reference means in control association with the circuit and under predetermined flow conditions therethrough, whereby a desired relation of circuit flow conditions to gage head measurements during actual gaging is maintained and predetermined.

6. An automatic self-adjusting gaging apparatus comprising a comparator gaging circuit connectable at one end to a source of air under pressure and at the other end to a gage head which controls flow through the circuit in accordance with a gaged product characteristic, said circuit having an indicating element positioned in accordance with circuit flow conditions, valve means in said circuit for setting and determining the relationship of response of said element to gage head measurements, signal means actuated at predetermined reference positions of said element, master reference means for control association with said circuit for obtaining predetermined flow conditions therein, and control means responsive to said signal means for automatically placing said reference means in control association with said circuit and setting said valve means to obtain predetermined positional response of said element whereby a desired relationship of element response to gage head measurements during actual gaging is predetermined and maintained.

7. An automatic self-adjusting gaging apparatus comprising a comparator gaging circuit connectable at one end to a source of air under pressure and at the other end to a gage head which controls flow through the circuit in accordance with a gaged dimension, said circuit including an indicating element movable in response to flow conditions therein, valve means in said circuit adjustable to determine the relationship between indicating positions of said element and flow through said gage head, first and second master reference means for control association with said circuit to obtain predetermined flow conditions therein, said element having a predetermined reference position corresponding to each of said reference means for nominal gaging operation, signal means associated with said circuit and operative by said element at each of said predetermined reference positions thereof, and control means responsive to said signal means for automatically placing said reference means alternatively in flow control relation with said circuit and setting said valve means to position said element at the corresponding reference positions, said control means including means for terminating the cycle of operation when said reference positions are obtained with the first and second reference means alternatively applied and without adjustment of said valve means therebetween, whereby a desired relationship of element response to gage head flow during actual gaging is maintained and predetermined as based on said master reference means during non-gaging periods.

8. An automatic self-adjusting gaging apparatus as set forth in claim 7 wherein said master reference means includes means providing reference orifice means placed in flow control relation with said circuit.

9. An automatic self-adjusting gaging apparatus as set forth in claim 7 wherein said master reference means includes physically dimensioned masters differing by a predetermined reference amount, and further including means for automatically alternatively placing said reference masters in control association with said gage head.

10. An automatic self-adjusting gaging apparatus as set forth in claim 7 wherein said master reference means includes means providing a pair of reference restrictions of a predetermined difference in size, and further comprising valve means for automatically disconnecting said gage head and selectively placing said restrictions in controlling relation with said gaging circuit.

11. An automatic self-adjusting gaging apparatus as set forth in claim 7 wherein said signal means includes a pair of photocell units, and means for adjustably positioning said units at reference positions along the path of movement of said indicating element for control of said units by said indicating element at reference settings.

References Cited in the file of this patent

UNITED STATES PATENTS

| | | |
|---|---|---|
| 2,665,496 | Wynne | Jan. 12, 1954 |
| 2,861,451 | Emmons | Nov. 25, 1958 |